Patented Mar. 27, 1934

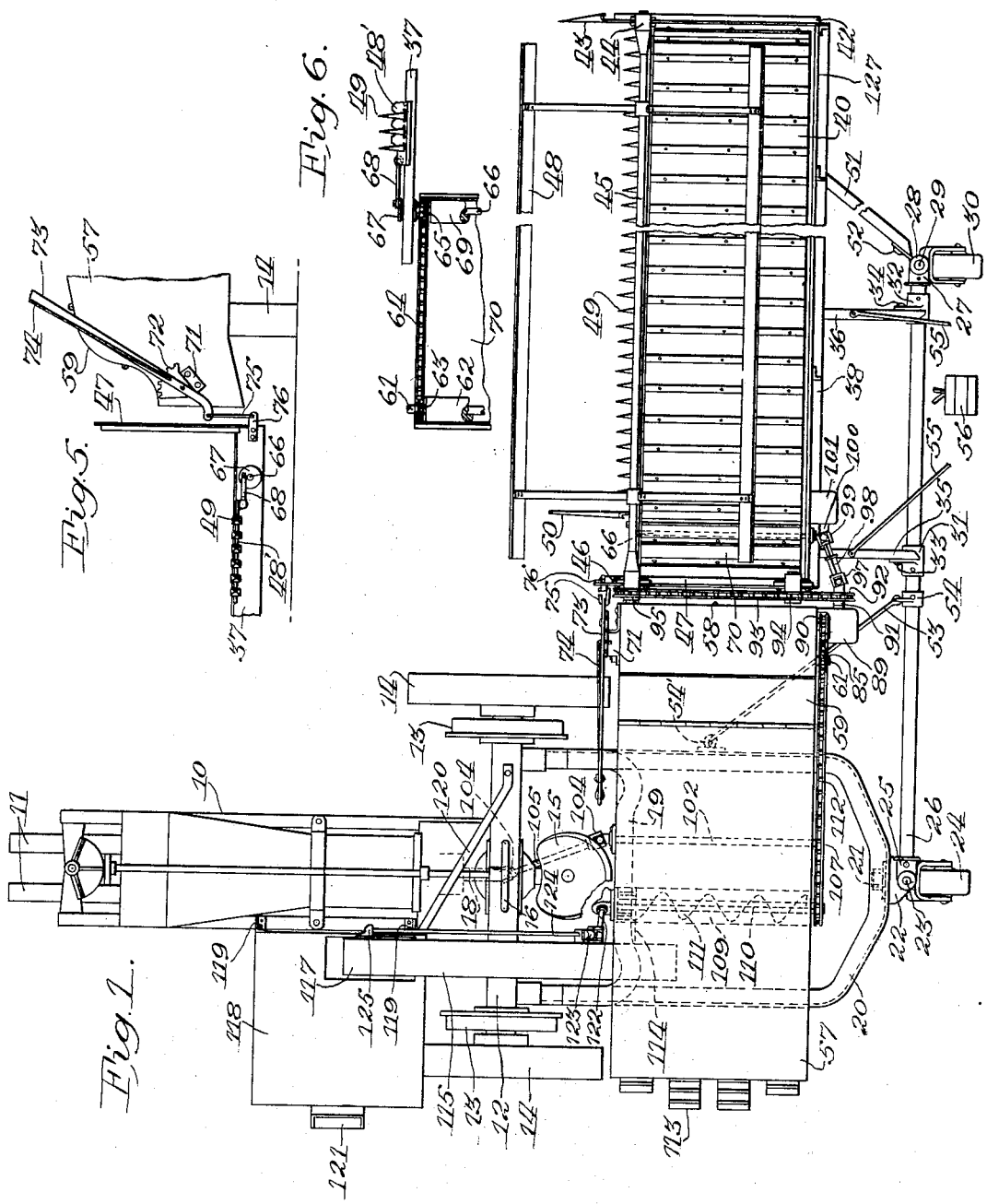

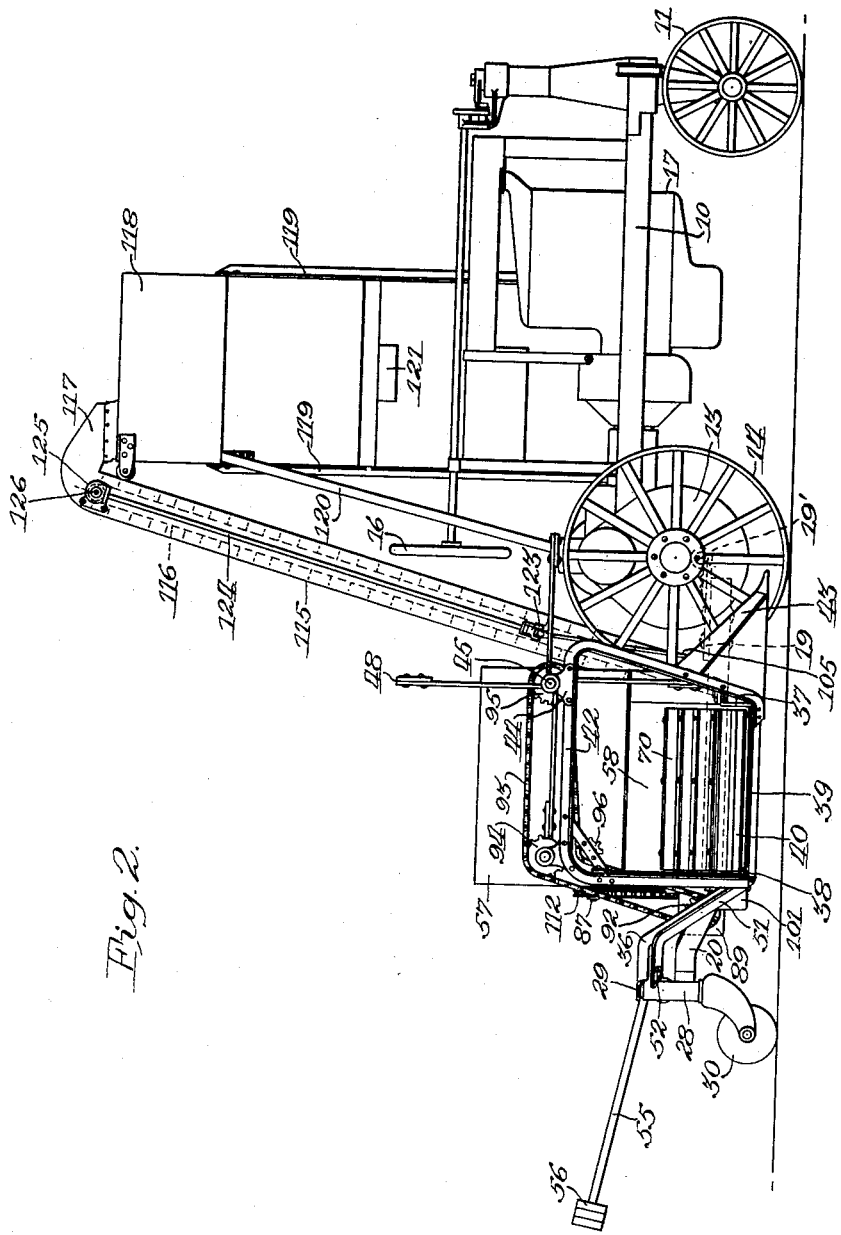

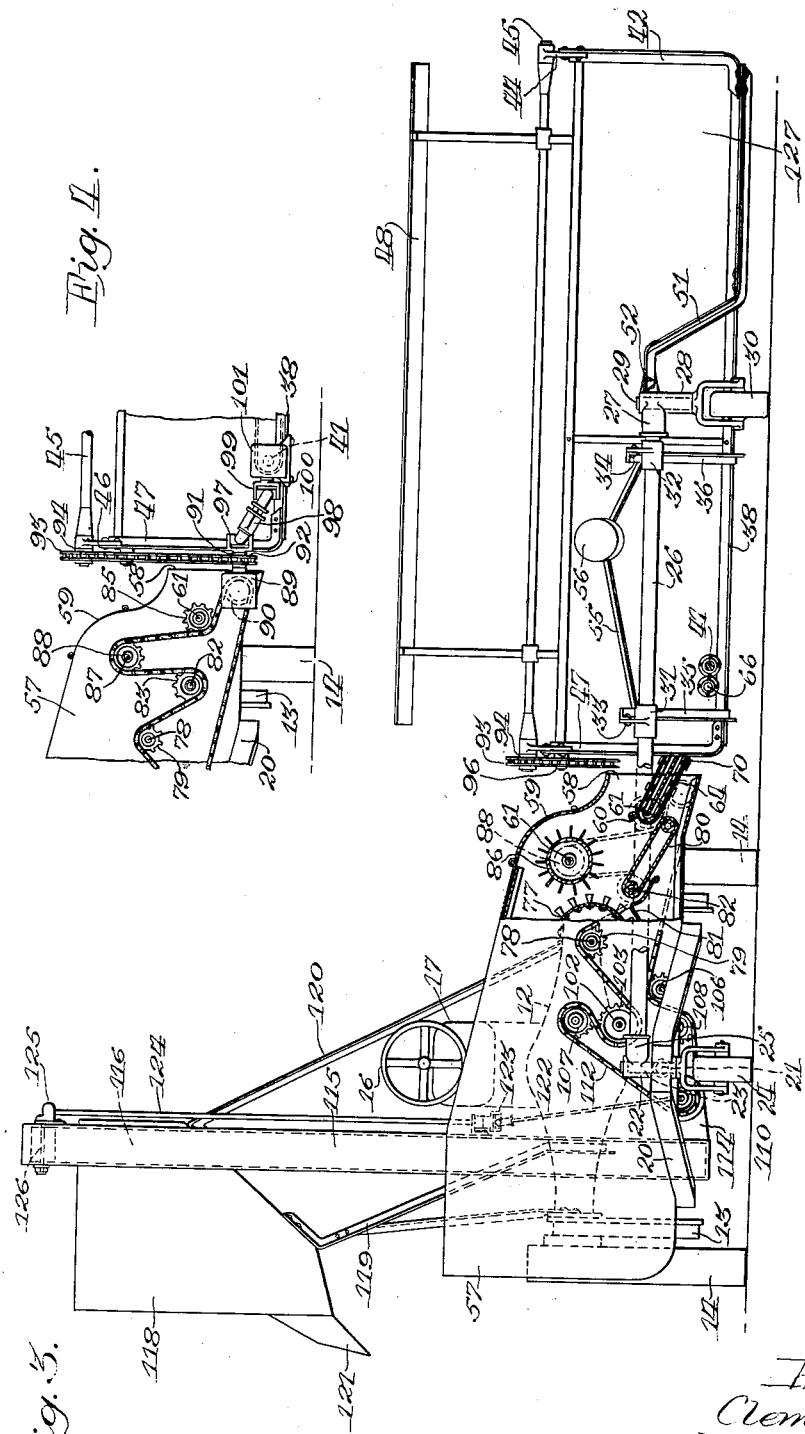

1,952,512

UNITED STATES PATENT OFFICE 1,952,512

TRACTOR HARVESTER THRESHER

Clemma R. Raney, Riverside, and Bert R. Benjamin, Oak Park, Ill., assignors to International Harvester Company, a corporation of New Jersey Application November 30, 1932, Serial No. 644,952

12 Claims. (Cl. 56—20)

The invention relates to a tractor harvester thresher, in which the harvester thresher is not only directly connected to the tractor, but parts thereof are actually supported by and carried on the tractor, so as to result in a compact tractor harvester thresher with all adjustable and controllable parts thereof to be adjusted and controlled by a single operator seated on the tractor.

Tractors, and especially the so-called general purpose tractors, are now used for almost all farm jobs, even in row crop cultivation. In other words, all kinds of special farm machine equipment has been designed for these special general purpose tractors. So far as these applicants know, no one has yet provided a harvester thresher specially designed to gain the advantages of such general purpose tractors.

Accordingly, the primary object of this invention is to provide such a tractor harvester thresher, parts of the harvester thresher to be located in a novel manner relative to each other, and to the tractor, to achieve a compact arrangement that will at all times be under easy control of an operator on the tractor.

Another object of the invention is to arrange parts of the harvester thresher on the tractor in balance, so that the weight of the grain tank on the thresher counter-balances the weight of the thresher part.

Another object is to provide such a tractor harvester thresher capable of making short turns in the field, so that all corners will be cut out clean.

A further object is to provide a continuous, straight line flow of the cut grain from the header through the thresher, so that the grain in the separation process will not have to travel around corners in its path of movement through the machine.

Still another object is to provide a machine that will be fully twenty-five per cent. lighter in weight over present known harvester threshers having the same capacity, thereby lowering the cost of harvester threshers.

Other objects will be apparent to those skilled in this art as the disclosure is more fully made.

Such objects may be achieved by the example of the invention shown in the accompanying sheets of drawings, wherein the general purpose tractor shown has a high arched rear axle structure and is supported on two widely spaced rear wheels, and at its front end is carried on a steering wheel support. A drawbar is connected to the rear axle structure, the drawbar carrying a rearwardly extending frame including a transverse, grainwardly extending support, the frame and support being carried on trailing caster wheels. The thresher, or separator part, is disposed transversely across the rear end of the tractor on said rearwardly extending frame and the harvester, or header part, is flexibly associated therewith in end to end relation, and extending in a grainward direction thereof, so that the thresher and harvester line up transversely to enable the cut grain to pass through said parts in a straight line path. The straw from the separator, or thresher, is discharged at right angles to the line of draft and stubbleward of the rear end of the tractor, while the cleaned grain is elevated into a tank carried by the frame of the tractor at its stubbleward side, the weight of the tank thus serving to balance the weight of the thresher carried at the rear, and grainwardly of the tractor.

In the drawings:

Figure 1 is a general plan view of the tractor harvester thresher;

Figure 2 is a general side elevational view from the grainward side;

Figure 3 is a rear elevational view, a portion of the thresher being shown in section;

Figure 4 is a fragmentary, rear elevational view, showing a detail of the driving mechanism;

Figure 5 is a fragmentary front elevational view to show the mechanism for adjusting the header platform; and, Figure 6 is a detail, plan view, partly in section, to show the drive for the cutting apparatus.

The tractor shown is of a standard type having a narrow, longitudinal main frame 10 supported at its front end on a steering wheel truck 11, the frame at its rear being connected to a transverse rear axle housing 12, from which depend at its ends, the gear housings 13 carrying stub axles to journal traction wheels 14, which carry and drive the rear end of the tractor. The rear axle housing is elevated and with the casing 13 forms an arched, rear axle to straddle row crops when the tractor is employed for cultivation purposes. Said housing 12 carries the driver's seat 15, adjacent which is the steering control 16 for steering the front wheel unit 11. This tractor is of the type adapted to make abrupt, short turns at corners. A motor 17 is carried at the forward end of the frame 10, which motor operates the usual gears, not shown, to drive the wheels 14, and a power take-off shaft 18, that is disposed substantially along the longitudinal median line of the tractor and extends rearwardly beneath the rear axle housing 12, so that shafting, later to be described, may be coupled therewith to drive an implement connected to and drawn by the tractor.

As shown best in Figure 1, the rear axle structure of the tractor pivotally carries the usual U-shaped drawbar, or support, 19 on pivots 19', to which the drawbar is connected, and carried thereby is a longitudinally, rearwardly extending U-shaped frame 20 provided in the center of its bight portion with a longitudinal hinge pin 21 also journaled in a bracket 22 carried by the frame 20. This bracket to the rear of the rear end of the pin 21 carries a vertically disposed spindle 23, the lower end of which is forked to journal a trailing caster wheel support 24 to support the frame 20 on the ground. The upper end of the spindle 23 pivotally carries a sleeve 25. Carried in this sleeve is a transverse, grainwardly extending harvester support member 26, the support at its grainward end being carried in another sleeve 27 formed as part of a bracket 28, said bracket turnably carrying a forked spindle 29, in which is journaled a castering, trailing wheel support 30. The sleeves 25, 27 and support 26 are fixed against rocking on their axes. Said support 26 also has fixed thereto two other spaced sleeve brackets 31 and 32, to each of which is pivotally connected, on respective pivot pins 33 and 34, forwardly extending line bars or levers 35 and 36.

These two levers 35, 36 carry across their front ends a transverse Z-bar 37, and, spaced rearwardly therefrom, a parallel angle bar 38, said bars carrying a header or harvester platform 39, over which operates an endless apron type of conveyer 40 supported at its grainward end on an appropriate idler roller shaft, and at its stubbleward end, on a driving roller shaft 41. An arched frame piece 42 is suitably carried at the grainward end of the platform, said frame piece 42 at its front edge supporting a grain divider 43, and at an upper front point carrying a bracket 44 for journaling a rotatable, transversely disposed reel shaft 45, which at its stubbleward end is journaled in a bracket 46 carried on an inner, arched frame piece 47. A conventional reel 48 is carried on and operated by the shaft 45, said reel in the usual manner acting to press standing grain stalks against a reciprocatory sickle 48' operating in guard fingers 49 fastened to the Z-bar 37. Said Z-bar also carries an inner divider 50. The outer, or grainward, end of the platform is stiffened against whipping action by a diagonal bar 51 fastened underneath the platform and pivotally connected at 52 to the bracket 27. To prevent side draft, a draw-rod 53 is pivotally connected to a sleeve 54 fixed to the harvester support 26, as shown, said rod 53 having its front end hingedly connected in an eye 54' carried by the grainward side of the frame 20. Connected to each line lever 35, 36, some distance forwardly of the support 26, are beams 55 which converge rearwardly to carry counter-balancing weights 56 for counter-balancing the weight of the platform, or harvester part. Said bars 55 rest on and fulcrum on the support 26 in performing their function.

The thresher part of the harvester thresher comprises an elongated thresher or separator housing 57 arranged rigidly and transversely across the frame 20 rearwardly of the tractor. This separator housing includes at its grainward end a feeder opening 58 located endwise of the stubbleward end of the platform conveyor 40. The top of the housing 57 adjacent this feeder opening is provided with hinged covers 59 to make interior parts accessible for adjustment and inspection, while front and rear sides are formed with slots 60 floatingly to carry a longitudinal cross-shaft 61 that drives a roller 62 (see Figure 6). At its front end the shaft 61 carries a sprocket wheel 63 to drive a chain 64, in turn driving a sprocket wheel 65 at the front end of a longitudinal shaft 66 journaled in the platform frame members 37, 38 at their stubbleward ends. The front end of the shaft 66 is formed with the usual eccentric wheel 67, to which is connected a pitman 68 that reciprocates the sickle 48' heretofore described.

The shaft 66 also carries a roller 69, around which is trained an endless spout elevator apron conveyer 70, the lower end thereof being in a position to receive the headed grain from the platform conveyer 40, to move the grain into the feeder opening 58 at the adjacent end of the thresher body 57.

As shown in Figures 1 and 5, the front, stubbleward corner of the header platform is supported adjustably from the adjacent, front wall of the thresher body, as follows:

A bracket 71, including a toothed rack quadrant 72, is carried by the front wall of the thresher. A long hand lever 73 having a detent release 74 is fulcrumed on the bracket 71, the lever extending a distance below its fulcrum to be connected to a link 75 connected in turn to an arm 76 secured to the stubbleward end of the Z-bar 37. The hand lever 73 extends laterally toward the seat 15 on the tractor, so that the operator stationed there can conveniently manipulate the lever to raise and lower the header platform to adjust the height of cut in accordance with the length of grain encountered in the travel of the machine. The counter-balance 56 heretofore described makes such adjustments easy.

A complete threshing mechanism inside the body 57 has not been shown, however a threshing cylinder appears at 77 in Figure 3, the same being carried and driven by a longitudinal shaft 78 journaled in the front and rear sides of said body 57. The rear end of the shaft 78 projects out of the body to carry a sprocket wheel 79 (see also Figure 4). Between the cylinder 77 and spout 70 is a feeder conveyer 80 that receives the grain from the spout conveyer 70 and directs it to the under side of the cylinder 77 at the concave 81. The endless feeder conveyer 80 is driven from a longitudinal roller shaft 82 carrying a driving sprocket wheel 83, while its lower end is trained around the rear projected end of the shaft 61 heretofore described, which carries a loose sprocket wheel 85 for that purpose. Above the feeder 80 and in advance of the cylinder 77 is a spiked feeding drum 86 on a longitudinal shaft 87, carrying a fast sprocket wheel 88.

A gear box 89 is mounted at the rear grainward corner of the body 57, said box carrying a longitudinal stub shaft carrying in turn a fast sprocket wheel 90 (see Figures 1 and 4), the box 89 being slotted to receive said sprocket wheel. Bevel gearing in the box 89, not shown, drives a transverse shaft 91 driving a sprocket wheel 92 (see Figure 2), around which is trained a driving chain 93, which passes around an idler sprocket wheel 94 suitably mounted at the rear end of the arch frame piece 42. Continuing ahead, this chain 93 drives a sprocket wheel 95 fast on the reel shaft 45 to drive the reel 48. The return run of the chain 93 passes over an idler wheel 96.

The shaft 91 is connected by a universal joint 97 to a telescopic shaft 98 and by another universal joint 99 (see Figure 4) to a transverse shaft 100 carried in a box 101 enclosing bevel gears, not shown, to drive the roller shaft 41 to drive the platform conveyer 40.

Looking again to Figures 1 and 3, it will be seen that a main drive shaft 102 is journaled longitudinally in the body 57, said shaft at its rear exposed end driving a sprocket wheel 103. The front end of this shaft 102 is flexibly connected by universal joints 104 and a shaft 105 to the power take-off shaft 18 of the tractor. The rear wall of the body 57 also carries idler sprocket wheels 106, 107 and 108, said body carrying another longitudinal shaft 109 that has at its rear exposed end a sprocket wheel 110 for driving the grain discharging auger conveyor 111 operable by the shaft 109. A continuous drive chain 112 is trained around all of the sprocket wheels on the rear wall of the body 57 to drive all parts and shafts from the shaft 102 and sprocket wheel 103. As shown in Figures 3 and 4, the chain 112 passes around the sprocket wheel 103, over the wheel 79, under wheel 83, over wheel 88, under idler wheel 85, around wheel 90, back over idler wheel 106, under idler wheel 108, around wheel 110, around wheel 107 and back to the main drive wheel 103. The main drive shaft 102, as viewed from the rear in Figure 3, rotates counter-clockwise, so that all parts will travel in the proper direction to move the grain through the harvester part and thresher part in a straight line from right to left, as seen in Figure 3.

The straw from the thresher is discharged from the machine by straw walkers 113 disposed in the body 57 at right angles to, or transversely of, the line of travel. The cleaned grain is moved forwardly by the auger 111 and dropped by a chute 114 (see Figure 1) into the lower end of an elevator housing 115 extending upwardly and forwardly to raise the grain by means of an elevator 116 to a spout 117 that discharges into an elevated grain tank 118 carried by the frame 10 of the tractor forwardly of its rear axle 12. Uprights 119 serve to so mount the tank, said tank being additionally braced by a brace 120 connected to the rear axle housing 12. The tank 118 has a discharge spout 121, so that a wagon may be drawn alongside the tractor below the tank, to receive the grain, by gravity, in the usual way.

The shaft 109 is extended forwardly and, by suitable direction changing gears, not shown, drives a shaft 122 flexibly connected by a universal joint 123 (see Figure 1), to drive a shaft 124 which, by means of gears 125 (see Figure 2), drives a shaft 126 in the upper end of the housing 115 to operate the elevator conveyor 116 to raise the grain into the tank 118.

The harvester header includes the usual backboard 127.

In operation and use the tractor 10 will be backed to the complete unit of separator and header, so that the U-frame 20 can be properly connected to the tractor drawbar 19. The tank 118 will be mounted on the tractor frame in the manner shown, and after connecting the line shafting 105 by the usual splined connection, not shown, to the power take-off shaft 18, the tractor harvester thresher is ready for operation.

The operator, and only one is needed, occupies the seat 15 on the tractor 10, and as the outfit is pulled along, the operator makes an occasional side glance and informs himself of the height of grain being encountered and easily makes up and down adjustments of the cutter bar and platform by means of the accessible lever 74, as desired. The harvester thresher properly trails the tractor because of the caster wheels 24 and 30, and enables making square turns at corners, to cut the field clean. The headed grain is moved by the apron conveyor 40 to the spout elevator 70, which in turn discharges the same onto the feeder conveyor 80 that delivers the material to the threshing cylinder 86 to be threshed.

In most combines, as now constructed, the header and thresher are disposed at a right angle to each other, so that the headed grain in passing from the header to the thresher must move through a right angle turn. Such turn frequently causes bunching and messing of the grain, so that it cannot properly be fed to the threshing cylinder. Such wadding of the headed grain temporarily chokes and interferes with the even speed of the cylinder so that inefficient threshing is bound to result. By the structure of our invention, the right angle turn is completely eliminated, as the header and thresher are disposed in end to end relation, so that the grain is fed head end first from the conveyer 40 to the spout 70, feeder 80, and so kept thereby head end first, to be fed into the threshing cylinder. The feed to the cylinder must, therefore, be even and substantially uniform, as the movement is in a straight-line, continuous path. Bunching cannot result; the cylinder speed stays constant and uniform; and, the grain is bound to be fed head ends first in a direct flow, all of which makes for the maximum threshing efficiency.

Any usual form of separating mechanism, not shown, cleans the threshed grain, the straw and chaff being discharged by the walkers 113 stubblewardly to one side of the path of travel. The cleaned grain is caught by the screw 111 and moved to the elevator 116, which in turn elevates the grain and discharges it into the tank 118. The disposition of the tank on the tractor is such as to offset and balance the weight of the thresher and header.

From this it will be seen that an improved tractor harvester thresher has been provided, which achieves all of the desirable objects heretofore recited and that the harvester thresher with its tank can be easily removed from the tractor to leave the tractor free for other desired uses.

It is the intention to cover herein all such changes and modifications of the disclosed practicable example as do not in material respects depart from the spirit and scope of the invention, which has been claimed in the following claims.

What is claimed is:

1. A harvester thresher for a tractor, said harvester thresher comprising an unstable wheel carried frame adapted to be connected to and supported from the tractor to make the same stable and trailed therebehind, a thresher part transversely disposed on said frame directly behind the tractor, and a transversely disposed harvester part carried grainwardly of the thresher part in end to end relation thereto offset from the tractor.

2. A harvester thresher for a tractor, said harvester thresher comprising an unstable wheel carried frame adapted to be connected to and supported from the tractor to make the same stable and trailed therebehind, a thresher part transversely disposed on said frame directly behind the tractor, a transversely disposed harvester part carried grainwardly of the thresher part in end to end relation thereto offset from the tractor, and means for causing a direct flow of the headed grain from the harvester part into the thresher part.

3. A harvester thresher for a tractor, said harvester thresher comprising an unstable wheel carried frame adapted to be connected to and supported from the tractor to make the same stable and trailed therebehind, a thresher part transversely disposed on said frame directly behind the tractor, a transversely disposed harvester support pivotally carried for floating movement by the frame at its stubbleward end, a wheel for carrying the outer end of the support, a header platform carried by the harvester support, said header platform being arranged transversely in end to end relation with the thresher part and offset from the tractor, and means for causing a direct flow of headed grain from the harvester part into the thresher part.

4. A harvester thresher for a tractor, said harvester thresher comprising an unstable wheel carried frame adapted to be connected to and supported by the tractor to make the same stable and trailed therebehind, a thresher part including a separator transversely disposed on said frame, a transversely disposed harvester support carried by the frame and having its stubbleward end pivotally connected to the frame for movement vertically, a wheel for carrying the outer end of the support, a header platform adjustably carried by the harvester support, said header platform being arranged transversely in end to end relation with the thresher part and the separator, and means carried by the thresher part accessible to the operator on the tractor for adjusting the header platform.

5. A harvester thresher for a tractor, said harvester thresher comprising an unstable wheel carried frame adapted to be connected to and supported by the tractor to make the same stable and trailed therebehind, a thresher part including a separator transversely disposed on said frame, a transversely disposed harvester support carried by the frame, a wheel for carrying the outer end of the support, said harvester support being disposed directly rearwardly of the thresher part and having its grainward end extending a distance grainwardly beyond the grainward end of the thresher part, forwardly extending line bars carried by the grainward end of the support, and a harvester platform transversely carried on the line bars in end to end relation with respect to the thresher part and the separator and offset from the tractor.

6. An unstable harvester thresher for a tractor having a frame wheel supported at one end, said harvester thresher comprising transversely aligned thresher, separator and harvester parts made stable by being connected to and carried rearwardly of the tractor with the harvester part offset relative to the line of travel of the tractor, a grain tank on the frame of the tractor, and means to convey cleaned grain upwardly and forwardly from the thresher part into the tank.

7. An unstable harvester thresher for a tractor having a longitudinally disposed main frame and transverse rear axle structure, said harvester thresher comprising transversely aligned thresher, separator and harvester parts made stable by being connected to and carried rearwardly of the tractor with the harvester part offset grainwardly relative to the line of travel of the tractor, an elevated grain tank mounted on the stubbleward side of the tractor frame forwardly of the rear axle structure to balance the weight of the harvester thresher on the rear end of the tractor, and means to convey and elevate cleaned grain forwardly from the thresher part into said tank.

8. A harvester thresher for a tractor, said harvester thresher comprising an unstable wheel carried frame adapted to be directly connected to and supported by the tractor to make the same stable and trailed therebehind, a thresher part carried on said frame, a tank mounted on the tractor, a harvester header platform located adjacent the thresher and mounted for adjustment, means to convey headed grain from the header platform into the thresher, means on the thresher part accessible to an operator on the tractor for adjusting the header platform, and means to convey cleaned grain forwardly from the thresher part into said tank.

9. A harvester thresher for a tractor having a power take-off shaft, said harvester thresher comprising an unstable wheel carried frame adapted to be connected to and supported by the tractor and trailed therebehind, a thresher part carried transversely directly behind the tractor on said frame and having a longitudinal driven shaft operatively connected to the power take-off shaft, a tank mounted on the tractor in a manner to offset the harvester thresher weight carried by the tractor, a harvester part supported in relation to the thresher part and transversely thereof, means to convey headed grain transversely from the harvester part into the thresher part, means to convey cleaned grain forwardly from the thresher part into said tank, and means operatively connecting all of the conveying means to be driven from the driven shaft in the thresher part.

10. The combination with a general purpose tractor having a wide tread rear axle structure and a narrow central body extending forwardly therefrom, of a harvester thresher attachment therefor comprising a longitudinally rearwardly extending frame carried on a wheel at its rear end and supported at its forward end from the tractor rear axle structure, a transversely disposed elongated housing enclosing thresher and separator mechanism, said housing carried on the frame in advance of said wheel, an elevated grain tank carried above and to one side of the tractor body by supports mounted on the body and rear axle structure, an elevator extending forwardly and upwardly from the housing to the tank, a transverse support extending grainwardly from the frame of the attachment and having its free grainward end supported by a wheel, and a harvester extending forwardly from the support and carried thereby in transverse end to end relation with the housing, said harvester discharging into the housing.

11. The combination with a general purpose tractor having a wide tread rear axle structure and a narrow central body extending forwardly therefrom, of a harvester thresher attachment therefor comprising a longitudinally rearwardly extending U-shaped frame having its leg ends connected to and supported from the tractor rear axle structure, a wheel centrally supporting the rear end or bight portion of the U-frame, a transversely disposed elongated housing enclosing thresher and separator mechanism, said housing carried across the legs of said frame, an elevated grain tank carried above and to the stubbleward side of the tractor body by supports mounted on the tractor, an elevator extending forwardly and upwardly from the housing to the tank, a transverse support extending grainwardly from the frame and having its grainward end carried by a wheel, a harvester adjustably carried by and forwardly of the support in transverse end to end relation with the housing, said harvester discharging into the housing, and means on the housing operable from the driver's station on the tractor to adjust said harvester.

12. The combination with a general purpose tractor having a wide tread rear axle structure and a narrow central body extending forwardly therefrom, of a harvester thresher attachment therefor comprising a longitudinally rearwardly extending frame supported at its forward end from the tractor rear axle structure and at its rear end being supported by a trailing caster wheel, a housing containing thresher and separator mechanism carried transversely across the frame, and a harvester disposed grainwardly of the housing and delivering thereinto.

CLEMMA R. RANEY.
BERT R. BENJAMIN.